Jan. 1, 1935.  E. O. COREY  1,986,324
LOCOMOTIVE LUBRICATING SYSTEM
Filed Aug. 27, 1934    4 Sheets-Sheet 2
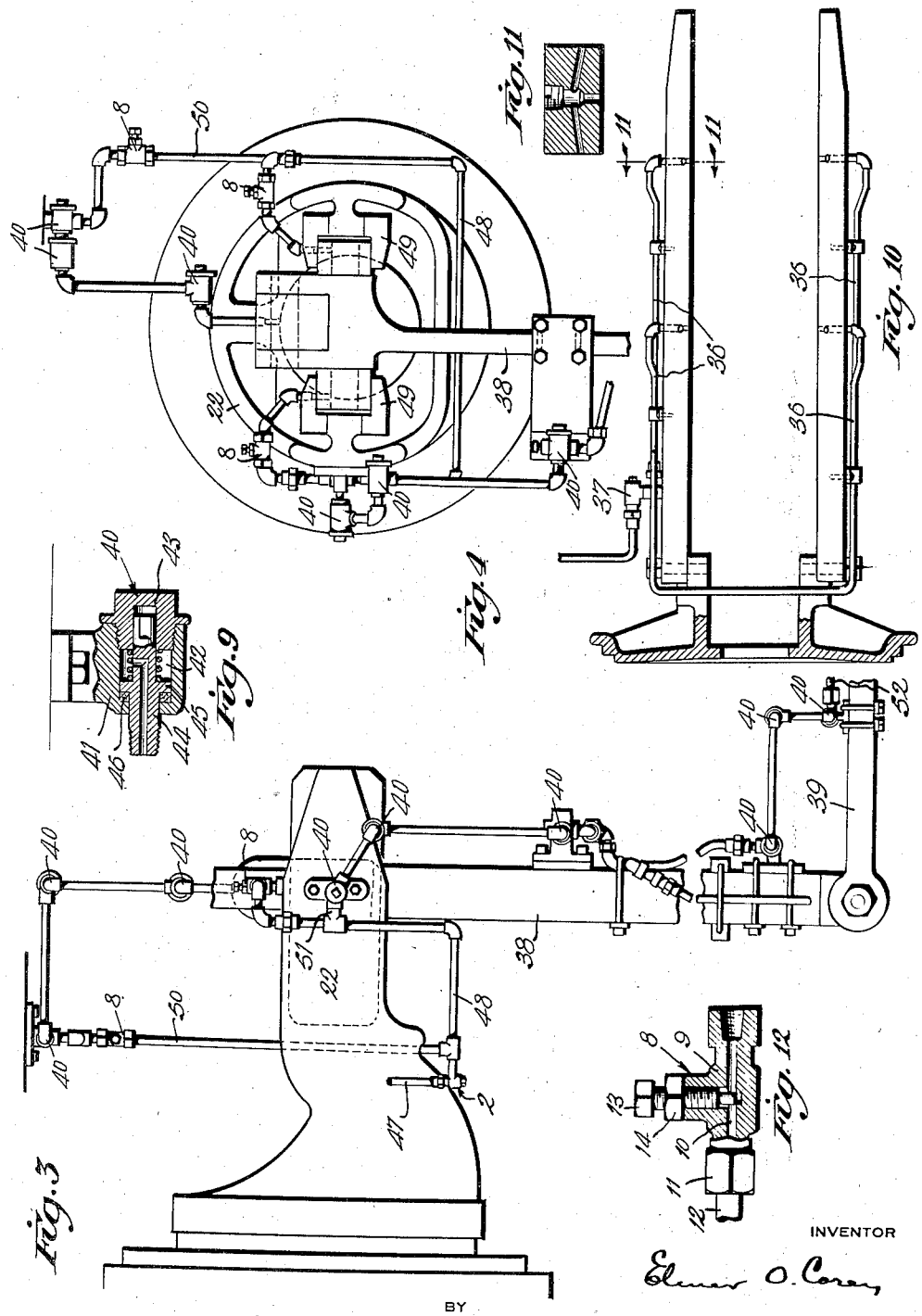
INVENTOR
Elmer O. Corey
BY
Wood & Wood
ATTORNEYS

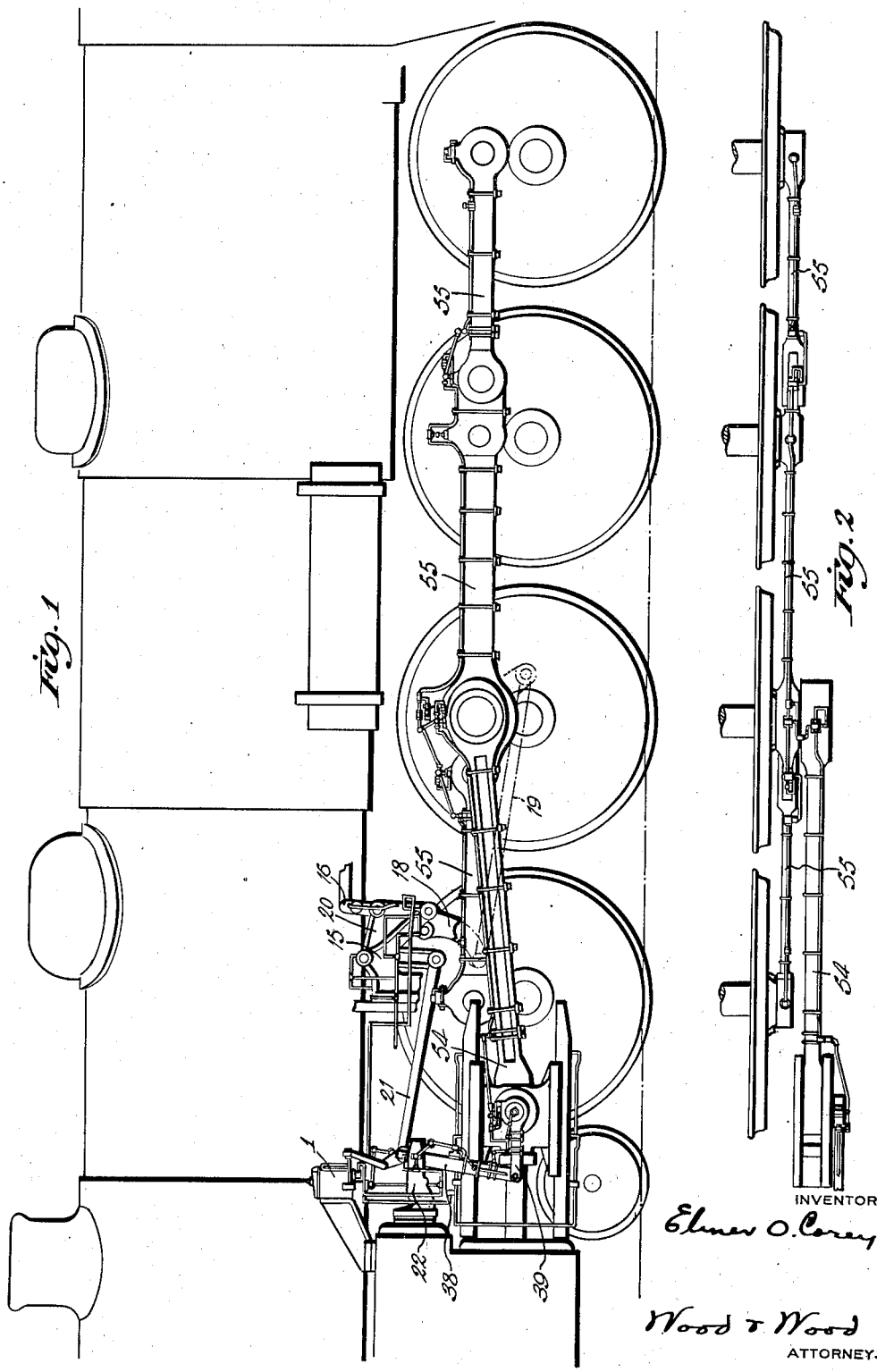

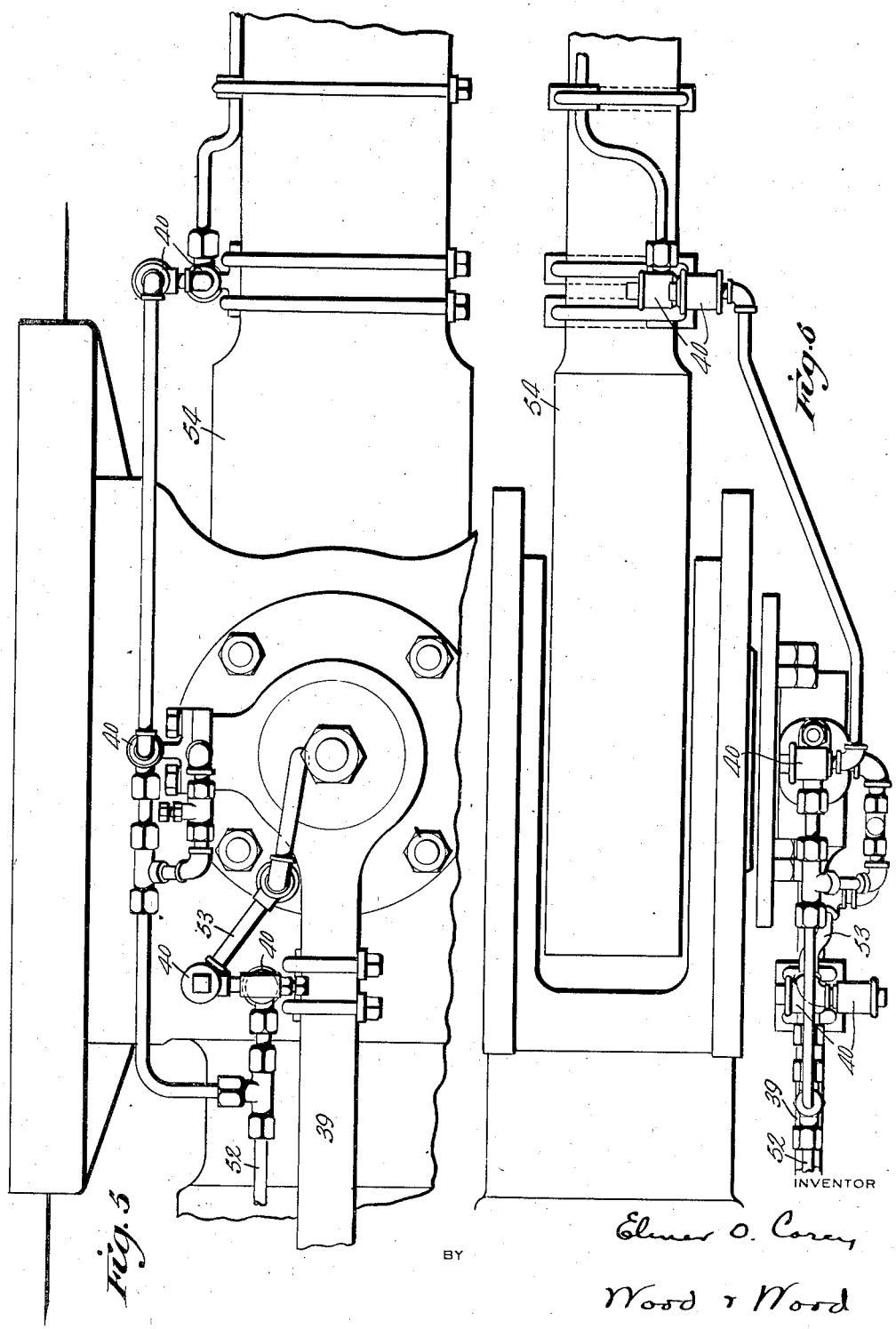

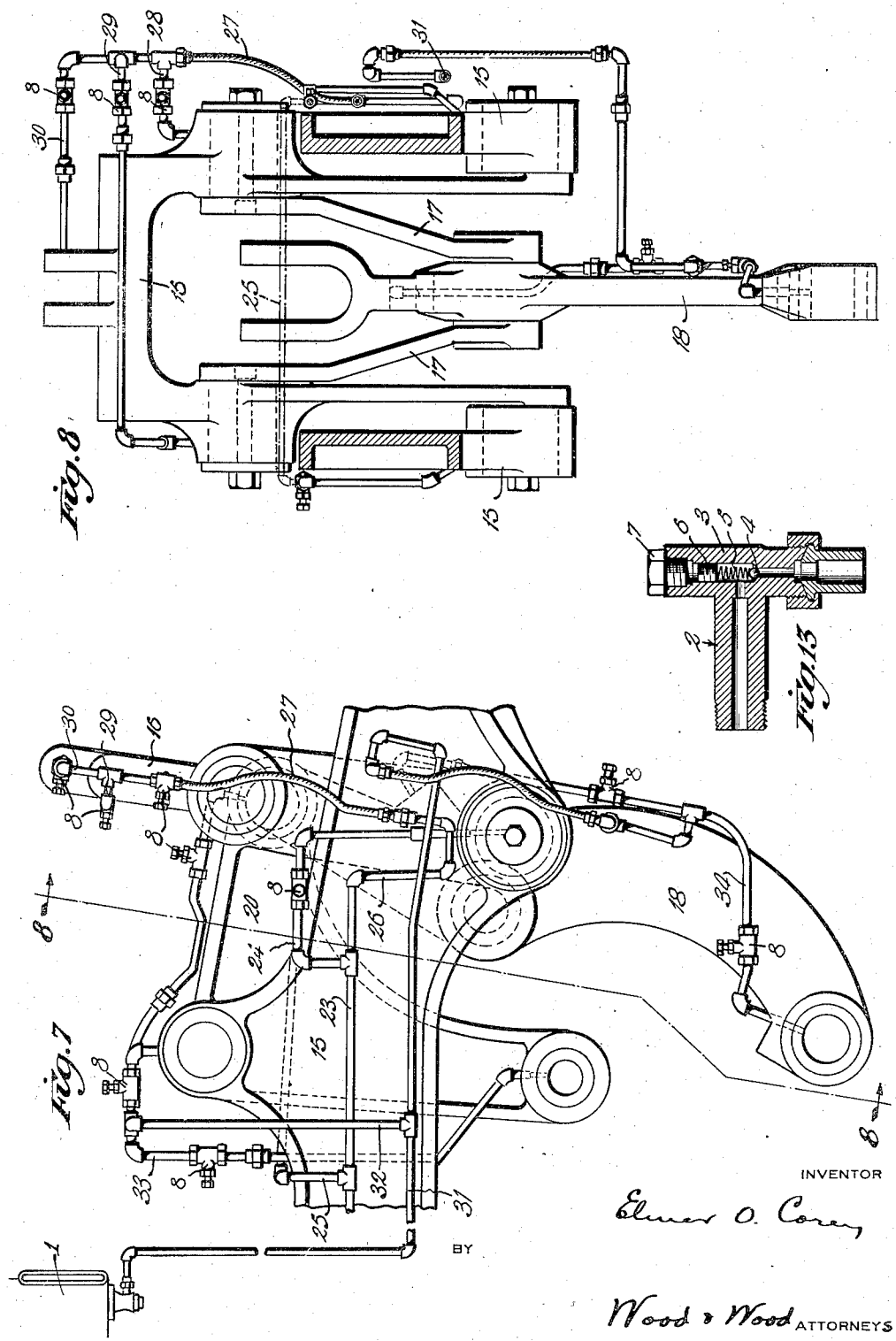

Patented Jan. 1, 1935

1,986,324

UNITED STATES PATENT OFFICE 1,986,324

LOCOMOTIVE LUBRICATING SYSTEM

Elmer O. Corey, Norwood, Ohio, assignor to The Edna Brass Manufacturing Company, Cincinnati, Ohio, a corporation of Ohio Application August 27, 1934, Serial No. 741,572

4 Claims. (Cl. 184—7)

This invention relates to a centralized distribution lubricating system for constantly supplying lubricant, while the parts are in motion, at high or determined pressures and in measured amounts to numerous parts, either moving or stationary to meet the requirements of the parts. The system is primarily applicable to locomotives and to which reference particularly is made, although its use in connection with other machinery is contemplated.

For locomotive use, on account of the difficulty and necessity of securely mounting the lubricant distributing pipe lines due to the severe vibration to which they are subjected and to avoid complexity in the system, it is preferable to have as small a number as possible, of main feed lines leading from the lubricator and to use one standard size of piping and fittings for each distributor unit for convenience in installation and maintenance. Each main feed line or distributor unit is equipped with as many branch lines, and the branches with sub-branch extensions, as the capacity of the main line will serve to distribute the necessary amount of oil to the various bearings connected in a unit of distribution. A pressure responsive valve is included in each main line located approximately at the terminal thereof, or point from which the branch lines diverge, for governing and controlling the supply to a maximum pressure necessitated for the bearing of the group requiring the highest delivery pressure so that a supply will be delivered to all points whether requiring high or low pressure. The valve, which may be also termed a terminal check valve, prevents draining of the main line each time a branch or sub-branch is broken or disconnected in making repairs or otherwise, and always insures a fully charged unit immediately upon the locomotive starting in motion. For those bearings or points requiring a metered or reduced quantity of lubricant, a regulating valve is interposed in the line preferably near the outlet or point to be lubricated so that the outlet is governed for a determined discharge.

The lubricator is preferably of a force feed type as shown and described in Letters Patent No. 1,897,791 issued to me February 14, 1933 having a plurality of feed outlets, each outlet having its own forcer plunger or pump. The lubricator is also equipped for handling several kinds or grades of lubricant.

When heavy lubricant is used, all the points that such kind of lubricant will answer, are in direct line connection under high pressure from the lubricator. High pressure lubrication can be carried from the lubricator to any point or points, as for lubricating the valve stem cross head, guides, combination lever, valve gearing, hubs, shoes, etc. From stationary to movable parts and from one movable part to a second, and when lubricating moving parts, the feed line is run to a stationary point nearest the moving oiling point and from such stationary point through a flexible conductor, or a rigid conductor with a flexible joint interposed therein, and with a flexible joint of the preferred type herein embodied, to the movable part.

The system primarily contemplates the control of all outlets to insure that the proper quantity of lubricant will be delivered, no matter what conditions may be encountered by change of temperature, as when cold a high pressure may be required, and the pressure automatically applied by the lubricator without any adjustments or change in regulation at the outlets.

An object of the invention is to provide a centralized lubricating system or unit, or a plurality of units from a single lubricator or source of supply, each unit automatically metering oil in exactly the correct amount to the various bearings, while the locomotive is running, eliminating hand lubrication and service, and assures perfect lubrication to all points without any attention of an attendant.

Another object of the invention is to carry the distributing pipe to a fixed point nearest a movable bearing or moving part and from such fixed point through a flexible joint or hinge leading and connecting onto the moving part and to the bearing or bearings thereof.

Another object of the invention relates to the provision of a conduit flexible joint or hinge for extending a distributing line from a stationary to a movable part, or from one movable part to a second, adapting one member of the joint to be rigidly fixed and the second swiveled, to swing and move with a movable part, with the members of the joint compressively engaged to prevent leakage and accommodate for wear.

Other features and advantages of the invention are more fully set forth in the description of the accompanying drawings forming a part of this specification, in which:

Figure 1 is a partial side elevation of a portion of a locomotive illustrating the system for lubricating the various bearings of a general type of driving gear, at one side of the locomotive.

Figure 2 is a top plan view of the driving gear as shown in Fig. 1.

Figure 3 is a detailed side elevation of a valve stem guide, combination lever, mounted upon guide and union link connecting combination lever with cross head.

Figure 4 is an end elevation of the valve stem guide showing the arrangement for lubricating the guides and the upper end of the combination lever.

Figure 5 is an enlarged side elevation of a locomotive cross head carrying the lubricant distributing connections and extending from a union link connecting with the cross head.

Figure 6 is a top plan view of the parts shown in Figure 5.

Figure 7 is a fragmentary side elevation of a portion of a valve gear, including radius bar, yoke, and bell crank lever and a pipe line for lubricating the various bearings applicable to either "Baker," "Young," "Walschart," or "Southern" types of valve gears.

Figure 8 is a section on line 8—8, Figure 7.

Figure 9 is a sectional view of a preferred form of flexible joint employed in carrying the lubricant distributing pipe or tube from either a fixed or a movable part.

Figure 10 is a side view of cross head guides illustrating a four point lubricant distribution.

Figure 11 is a section on line 11—11, Fig. 10.

Figure 12 is a detailed sectional view of a preferred form of regulating valve.

Figure 13 is an enlarged central section through a preferred pressure responsive valve.

This invention, in part, was included in an application filed by me March 26, 1931, Serial No. 525,468, for Locomotive lubrication system and patented July 24, 1934, No. 1,967,497, and incorporates an extension of lubrication distribution for the entire driving gear of a locomotive.

A lubricator 1 of a type known as a multi-force feed in which each of the feeds has its own forcing apparatus of the nature of a plunger pump, each feed and its pump constituting a delivery unit independent of the others, provides for the supply and delivery of the lubricant. All of the pumping units for the number of lubricators are mounted within and receive their supply from a reservoir or reservoirs and all operated from a shaft engaged through the reservoir. This shaft is operated by suitable mechanism connecting with an operating part of the locomotive as the driving gear so that the pumps are always in operation when the locomotive is in motion.

The feed outlets of the several forcer or pumping units are generally disposed in a longitudinal line or row from the base or lower side of the reservoir and all of the moving parts of each are immersed at all times in oil from the reservoir, therefore requiring no attention insofar as lubrication is concerned. The forcer or pumping units, each are provided with adjustments for increasing or decreasing the capacity thereof so that a required amount necessary for each feed line can be accurately obtained and maintained.

Each feed line from the lubricator when employed for supplying the lubricant to a plurality of bearings or parts preferably is provided with a pressure responsive valve 2 located at a point rearward, from which branch or manifold lines are connected for governing and controlling the supply to a maximum pressure required for delivery of lubricant to all of the bearings or parts of a group to be lubricated. Should the pressure required for the different parts vary from one another, the valve is set for governing the supply to a maximum pressure necessitated for the bearing or part of the group requiring the highest pressure.

A simple and efficient form of pressure responsive valve is disclosed in Figure 13, comprising, a body 3 with a right angled bore therethrough, a ball check valve 4 seated under the pressure of a spring 5 having one end engaging the ball, and an opposite end engaging against an adjusting screw 6 screw-threaded within the body and housed by a cap screw 7 screw-threaded into an end of the body. The inlet and outlet end of the valve are formed for making suitable connections with the pipe line.

Each outlet is provided with a regulating valve 8 preferably of a type of construction as shown in Figure 12, for controlling or regulating the amount of lubricant delivered. The regulating valve, comprises, a body 9 having a central bore or passage 10 therethrough, the opposite longitudinal ends of the body formed for making pipe connections therewith. For instance, one end is internally threaded for making a pipe connection directly therewith, while the opposite end provides for a union coupling and is externally threaded to receive a coupling nut 11 with the face end of the body countersunk to serve as a seat for the head end of a coupling sleeve or tail-piece 12 locked to the body by the coupling nut 11.

A regulating valve 13 is threaded into the body and the free end traverses the bore 10, the stem of the regulating valve being locked in its set position by a lock nut 14 engaged upon the threaded stem portion of the valve. The regulating valve thus provides at one end for making a permanent pipe connection, and at the opposite end for a removable connection or union, and the union sleeve or tail-piece 12 arranged to be either threaded or brazed upon a pipe or fitting or directly tapped into a threaded bore in the part to be lubricated.

It is recognized that there are several different types of valve gears employed in locomotive design and therefore, the piping for the various valve gears must be modified one over the other to meet the different conditions encountered.

In Figures 7 and 8, a "Baker" type of valve gear is illustrated and the piping arrangement for lubrication of the various bearings will, to a degree, serve for "Young," "Walschart," and "Southern" types of valve gears.

The numeral 15 indicates a pair of stationary side frames suitably spaced apart for supporting various elements of the valve gear therebetween, as a radius bar 16 of yoke form, having a pair of limbs, each provided with a trunnion journalled in a bearing of a respective stationary frame 15. The radius bar pivotally carries a shackle 17 disposed between the yoke limbs thereof. The shackle pivotally supports a lever 18 therebetween, one end of the lever 18 pivotally connecting with a connecting link 19 and the opposite or upper end of the lever is of yoke form or bifurcated to pivotally connect with a limb of a bell crank lever 20. The bell crank lever 20 is pivotally mounted upon stationary bars of the side frames and the second or lower limb of the bell crank lever 20 pivotally connects with one end of a connecting link 21 which in turn extends forwardly to the valve stem guide 22.

Two lines of piping for two distributing units are extended from the lubricator 1 to the valve gear for lubricating the various bearings of the radius bar 16, shackle 17, lever 18, and bell crank 20, comprising, a main feed line or pipe 23 leading from the lubricator and extending along one of the side frames 15 and rigidly secured thereto by cleats and other fastener devices. The main line 23 has several branch lines extending therefrom as a branch line 24 with a regulating valve 8 interposed therein, the branch line extending to connect its outlet with a suitable bore or passage in the bearing for one of the trunnions of the radius bar 16. A second branch 25 connects with the main line 23, and extends across the stationary frames to reach the bearing for the opposite trunnion of the radius bar. This branch line 25 is also equipped with a regulating valve 8. A third branch line 26 connects with the main line 23 at a suitable point from the stationary frame to the upper end of the swinging radius bar, the branch line extending from a stationary part to a movable part, having a section of flexible tubing 27 interposed therein or the flexible tubing may be substituted by a flexible joint. A preferred type of joint will be hereinafter described.

The branch line 26 possesses several sub-branches, each extending to a respective bearing of the radius bar, as for instance: sub-branch 28 leads to one of the bearings for shackle 17; 29, a sub-branch leading to an opposite bearing for the shackle; and 30, to the bearings at the upper end of the radius bar to which a link is connected. Each of the sub-branches 28, 29, 30, has its own regulating valve 8 interposed therein for regulating the supply of lubricant, which is required for the bearing which it serves.

A second main feed line 31 (see Figures 7 and 8) extends from the lubricator along one of the stationary side frames to which it is anchored, and provided with a plurality of branches, has a branch 32 leading to a stationary bearing on the frame 15 for serving the fulcrum of the bell crank lever 20 with a regulating valve 8 interposed in the line for regulating the lubricant feed to said bearing.

A sub-branch 33 connects with the branch 32, and through a flexible tube or joint, leads to and connects with a movable bearing of the bell crank lever 20. The main feed line 31 also carries a flexible connection to extend to the lever 18 from whence it branches for lubricating various points on said lever movable with the lever and as illustrated constitutes a branch 34 extending to the movable bearing at the lower end of said lever and to a bearing joining the lever to the shackle 17. A regulating valve is interposed in the line to serve the branches.

In Figure 10, a piping arrangement is shown for distributing the lubricant to the upper and lower stationary guides for the engine cross head.

A branch line 36 extends from a manifold 37 mounted on the upper guide to a distributing point of the upper guide and a second branch line 36 from the manifold to a distributing point of the lower guide.

In Figure 9 a preferred type of conduit flexible joint 40 is illustrated and incorporated in several different types of fittings as for instance, one element of the joint may be provided with means for rigidly securing the same to a stationary support or it may serve as a manifold for making branch connections all directed toward reducing the number of fittings and pipe connections to simplify installation, thereby minimizing the possibilities for leakage. In general, the flexible joint as shown in Figure 9 constitutes a hollow body with provision for making a pipe or line connection and may be either movable or stationary, being movable when the body line connection is made from one movable point to a second movable point, or it may be stationary when the service is from a stationary to a movable point.

The body 41 is counterbored to provide a cylindrical chamber 42, closed at one end by a cap 43 screw-threaded into the body. A pipe connecting tubular stem 44 is journalled within the body and cap and has an annular head or flange 45 intermediate thereof within the chamber 42, providing a shoulder compressed against a packing 46 about the shank or stem 44, between the shoulder and end wall of the chamber, by a spring between the flange 45 and inner end of the cap 43. The free or rear end of the stem rotating within the cap is squared or surfaced for a wrench hold. The stem 44 is rotatable within the cylindrical body, or the body and stem can swivel one upon the other and the parts constantly under compression axially to prevent leakage from the joint and to accommodate for wear. The stem is angle bored to provide a conduit constantly open to the chamber 42 and through the joint.

In Figures 3 and 4 a preferred arrangement of piping or lubricating distributing lines are disclosed for lubricating various points of the valve stem guide 22, combination lever 38, and union link 39, which connects the combination lever 38 to the cross head, these parts having movable bearings and journals, difficult to supply and moving under heavy and extended motion. It has been experienced that the use of flexible tubing in making a jump from a stationary to a relatively movable joint, or from one movable joint to a second movable joint, cannot be efficiently and reliably employed. The motion and vibration is too severe for the tubing so that its life is soon destroyed causing it to leak or break.

The main line 47 extending from the lubricator is provided with a pair of branches 48 respectively leading to the opposite guides 49—49 of the valve stem guide 22 for lubricating the slides of the combination lever 38. Each of said branches 48 has a regulating valve 8 interposed therein. A third branch 50 of the main line extends upwardly and connects with the body of a flexible joint 40 secured to a stationary support from which it continues through the swivel stem of the joint 40 to the link connecting the combination lever with the bell crank lever. In the portion of the branch line between the flexible joint and the point of connection with the link, two flexible joints are interposed, both having their members free to swivel one upon the other and may be referred to as a double flexible joint to distinguish it from the type in which the body of the joint is stationary.

A fourth branch line 51 connects with the main supply line 47 having several flexible joints 40 interposed therein to carry the line from a stationary joint of the valve stem guide 22 to the combination lever and from the combination lever 38 to the union link as from a movable member to a second movable member. The flexible joint 40 has its body mounted upon the union link to provide for a line as 52, leading to a movable joint and having a branch line to the journal of the end of the link, and a second to a movable joint as the cross head pin, so that in the sub-branch line 53, a flexible joint is interposed as the connection is from relatively fixed to a movable point. In the branch line 51 one of the flexible joints in advance of the sub-branch connections can be of the regulating valve type so that the sub-branch has its own regulating control. The manifold and regulating valve type of flexible joint is also provided for the sub-branch lines carried by the union link. This type of lubricating means may be extended to the main connecting rod 54 and side parallel rods 55 for oiling the main pin and side rod bearings as shown in Figures 1 and 2.

The piping wherever possible is firmly anchored, either by screws engaged through the brackets of the fittings or by cleats or U-bolts straddling a part as shown in Figures 1, 3 and 5 for rigidly mounting the conductors upon the combination lever 38, union link 39, and other moving links or rods.

The best example of distribution unit with all phases is illustrated in Figure 3 in which the main feed line 47 has certain branches leading to stationary parts, others from a stationary to a movable part and from a movable to a second movable part requiring the interposition of one or several flexible or hinge joints and a combined hinge joint and manifold with a regulating valve for each manifold outlet, thus centralizing the branch line take offs from the main line.

Having described my invention, I claim:

1. A centralized distribution lubricating system for the bearings of valve stem crosshead guide, combination lever supported by the valve stem crosshead guide and union link connecting with the lower end of the combination lever of a locomotive, comprising a source of lubricant, a main conductor line leading from the source to a stationary point on the valve stem crosshead guide, a swinging joint movable conductor line from said stationary point to a fixed point on the combination lever, a swinging joint movable conductor line from a fixed point on said combination lever to a fixed point on the union link, and branch lines from said fixed point on said union link to the several bearings of the union link.

2. A centralized distribution lubricating system for the bearings of valve stem crosshead guide, combination lever supported by the valve stem crosshead guide and union link connecting with the lower end of the combination lever of a locomotive, comprising a source of lubricant, a main conductor line leading from the source to a stationary point on the valve stem crosshead guide, branch conductor lines connecting with said main line leading to the bearings of the valve stem crosshead guide, a swinging joint movable conductor line from said stationary point to a fixed point on the combination lever with interconnected branch line for bearings capable of being reached on said combination lever, a swinging joint movable conductor line from a fixed point on said combination lever to a fixed point on the union link, and branch lines from said fixed point on said union link to the several bearings of the union link.

3. A centralized distribution lubricating system for the bearings of valve stem crosshead guide, combination lever supported by the valve stem crosshead guide and union link connecting with the lower end of the combination lever, crosshead and running gear elements at one side of a locomotive, comprising, a source of lubricant, a main conductor line leading from the source to a stationary point on the valve stem crosshead guide, a swinging joint movable conductor line from said stationary point to a fixed point on the combination lever, a swinging joint movable conductor line from a fixed point on said combination lever to a fixed point on the union link, the line continuing from a fixed point on one moving element of the locomotive running gear through a swinging joint to an adjoining running gear element, and one or more branch lines connecting with said main conductor line at an appropriate point of the portion of the main line carried by an element of the running gear to the bearings thereof.

4. A centralized distribution lubricating system for the bearings of valve stem crosshead guide, combination lever supported by the valve stem crosshead guide and union link connecting with the lower end of the combination lever, crosshead and running gear elements at one side of a locomotive, comprising, a source of lubricant, a main conductor line leading from the source to a stationary point on the valve stem crosshead guide, a section of conductor line fixed to extend along each element of the running gear, flexible conductor means respectively connecting the adjoining ends of the sections, and one or more branch lines for the respective bearings of each running gear element, each connecting with the main line section carried by the running gear element.

ELMER O. COREY.